Figure 1:
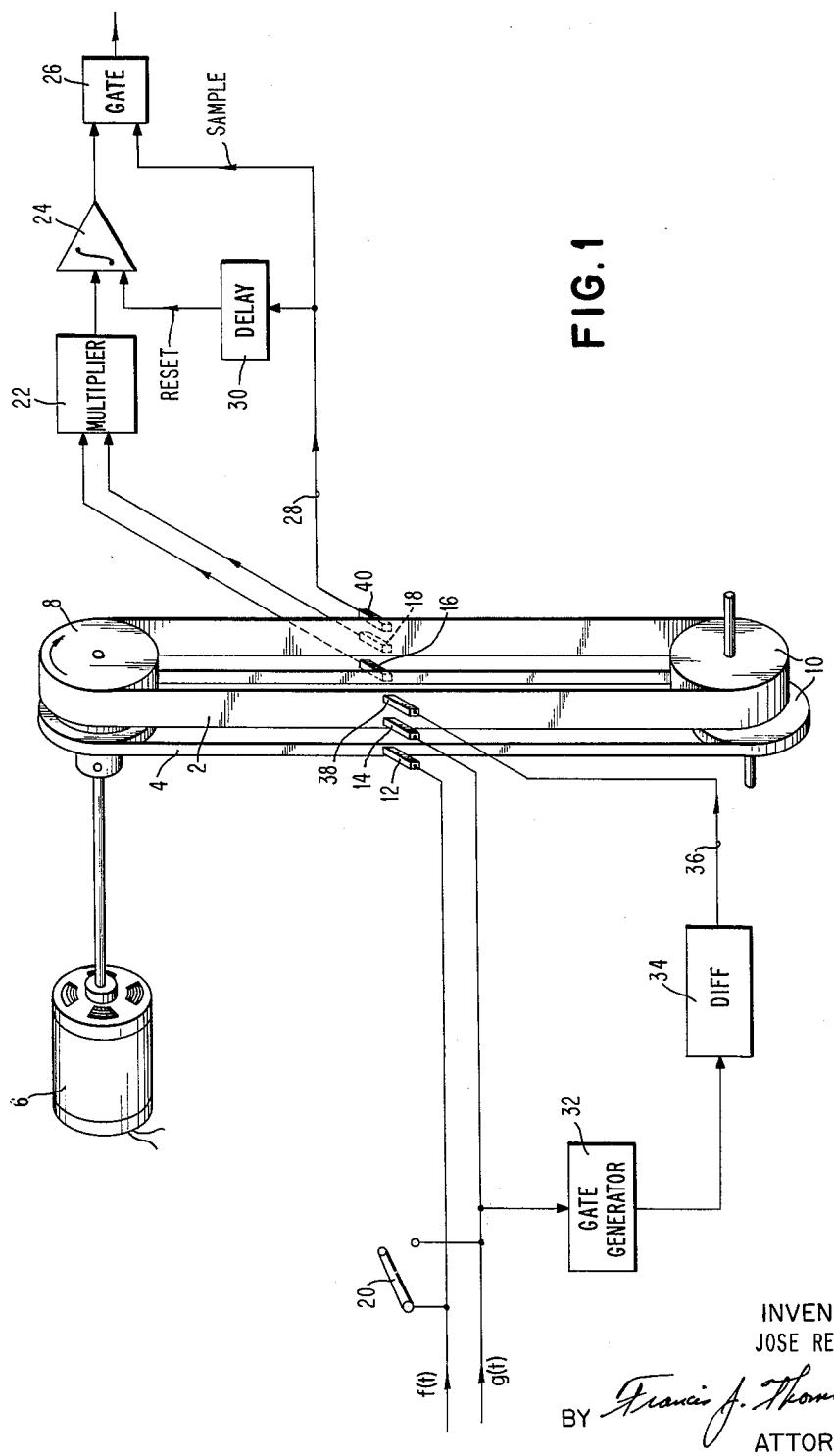

INVENTOR
JOSE REINES
BY *Francis J. Thomas*
ATTORNEY

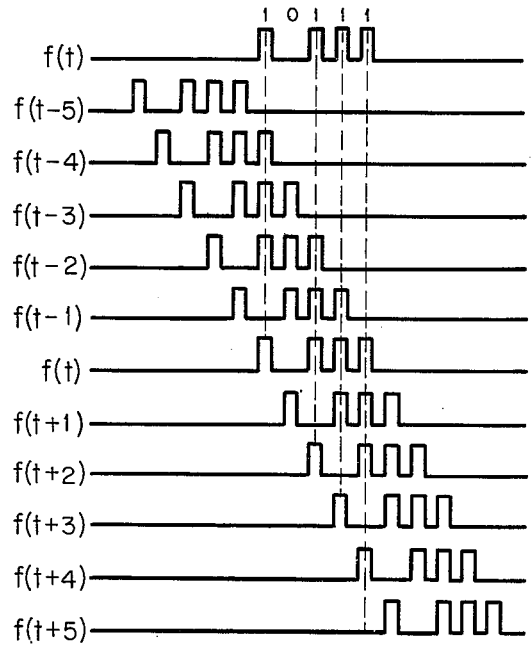
FIG. 2a
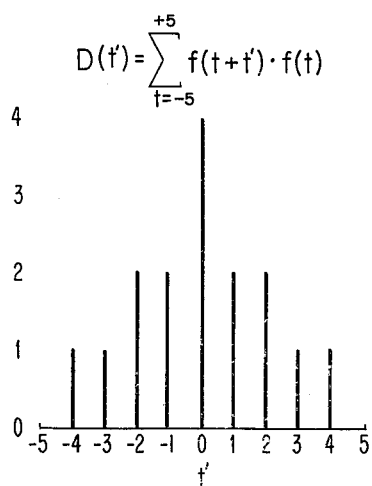
$$D(t') = \sum_{t=-5}^{+5} f(t+t') \cdot f(t)$$
FIG. 2b
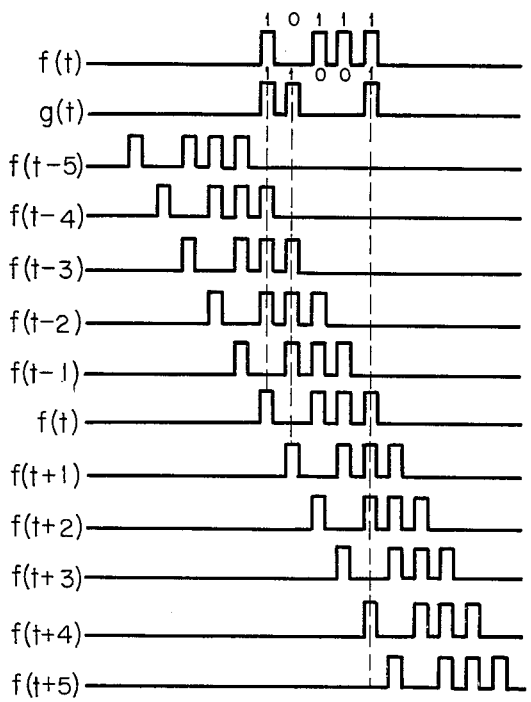
FIG. 3a
FIG. 3b
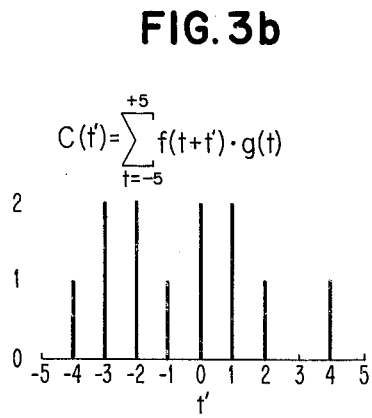
$$C(t') = \sum_{t=-5}^{+5} f(t+t') \cdot g(t)$$

$$D(t') = \int_{-4}^{+4} f(t+t') \cdot f(t) \, dt$$

$$C(t') = \int_{-4}^{+4} f(t+t') \cdot g(t) \, dt$$

United States Patent Office 3,100,297
Patented Aug. 6, 1963

3,100,297
FUNCTION GENERATORS
Jose Reines, Crompond, N.Y., assignor to International Business Machines Corporation, New York, N.Y., a corporation of New York
Filed June 28, 1961, Ser. No. 120,310
7 Claims. (Cl. 340—174.1)

This invention relates to function generators and, in particular, to apparatus for generating autocorrelation functions and cross-correlation functions.

Autocorrelation function and cross-correlation function generators are useful in many arts where signals representative of physical objects are to be analyzed, such as character recognition and seismographic record identification.

The autocorrelation function of a function is a measure of the similarity between the function and itself, shifted through various displacements; while the cross-correlation function of two functions is a measure of the similarity between the functions.

The autocorrelation function $D(t')$ of an input time-varying function $f(t)$ is defined as the sum of the products of the function and the function displaced in time, and for discrete (digital) input function is written:

$$D(t') = \sum_t f(t+t') \cdot f(t)$$

For a continuous (analog) input function, the autocorrelation function is written:

$$D(t') = \int f(t+t') \cdot f(t) dt$$

The cross-correlation function $C(t')$ of two input time-varying functions $f(t)$ and $g(t)$ is defined as the sum of the products of one function and the other function, displaced in time and, for discrete (digital) input functions, is written:

$$C(t') = \sum_t f(t+t') g(t)$$

For continuous (analog) input functions, the cross-correlation function is written:

$$C(t') = \int f(t+t') \cdot f(t) dt$$

The present invention resides in the discovery of simple and unique apparatus for sequentially generating time-shifted functions and, from these functions, generating either the autocorrelation function or the cross-correlation function of the input function(s).

An object of this invention is to provide an apparatus for generating either autocorrelation functions or cross-correlation functions.

Another object of this invention is to provide an apparatus for generating either autocorrelation functions or cross-correlation functions with the same structure.

A further object of this invention is to provide an apparatus for generating either autocorrelation functions or cross-correlation functions of either digital or analog time-varying input functions.

Another object of this invention is to provide an apparatus for repeatedly generating a plurality of time-varying signals, each displaced in time with respect to the other, where the displacement is different during successive generations.

The foregoing and other objects, features and advantages of the invention will be apparent from the following more particular description of a preferred embodiment of the invention as illustrated in the accompanying drawings.

In the drawings:

FIGURE 1 is a diagram of a preferred embodiment of the invention.

FIGURE 2, consisting of FIGS. 2a and 2b, is a diagram illustrating the generation of an autocorrelation function of a digital input signal.

FIGURE 3, consisting of FIGS. 3a and 3b, is a diagram illustrating the generation of the cross-correlation function of two digital input signals.

Figure 4A:
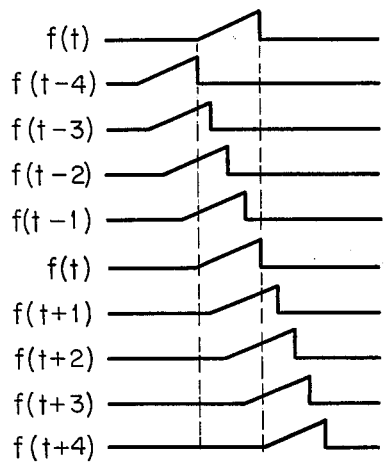
Figure 4B:
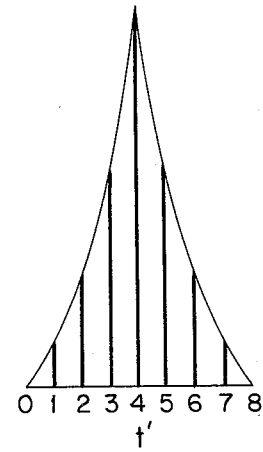

FIGURE 4, consisting of FIGS. 4a and 4b, is a diagram illustrating the generation of an autocorrelation function of an analog input signal.

Figure 5A:
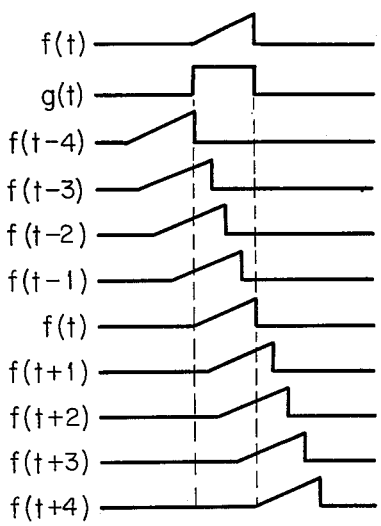
Figure 5B:
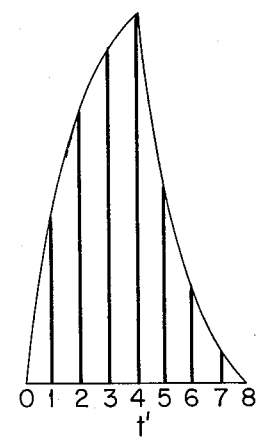

FIGURE 5, consisting of FIGS. 5a and 5b, is a diagram illustrating the generation of the cross-correlation function of two analog input signals.

The function generator shown in FIGURE 1 contains two recycling magnetic tape record loops 2 and 4, of different lengths. The record loops are driven in a clockwise direction at the same speed by a motor 6 and a pulley 8. Two idler pulleys 10 are used to maintain tape tension.

The input functions are recorded on the magnetic tape record loops by read in heads 12 and 14, and read out of the record loops by heads 16 and 18. Since the records differ in length, data recorded on corresponding portions of the records is presented to the read out heads at different relative times during successive cycles. That is, during successive revolutions (cycles) of the records, data on the longer record 12 is presented to its read out head 16 at successively greater time displacements from the time that the corresponding data on the shorter record 14 is presented to its read out head 18. Thus, the difference in record length causes incremental time displacements between the recorded data, corresponding to $t'$ in the above formulas.

When autocorrelating, a single time-varying input function $f(t)$ is applied to its read in head 12 and simultaneously to the second read in head 14 through a closed switch 20. The stored function $f(t)$ is presented to both read out heads 16 and 18 simultaneously during the first cycle. Since one record 4 is longer than the other record 2, the stored function $f(t)$ arrives at the read out heads 16 and 18 with a time displacement of one increment (corresponding to $t'=1$ in the formula) during the second cycle. During successive cycles, the time displacement $t'$ increases discretely and, in this manner, all displacements are generated.

When cross-correlating, the switch 20 is open and two time-varying input functions $f(t)$ and $g(t)$ are applied to their corresponding records. The apparatus operates in the manner described above to incrementally displace (delay) the function $f(t)$ with respect to the function $g(t)$.

The output signals from the read out heads 16 and 18 are applied to a multiplier 22. When autocorrelating, the multiplier output represents $f(t+t') \cdot f(t)$; and when cross-correlating the multiplier output represents $$f(t+t') \cdot g(t)$$

All outputs of the multiplier that are generated during one cycle (one revolution of the tapes) are summed in an integrator (accumulator) 24, and represent $$\sum_t f(t+t') \cdot ft$$

when autocorrelating (digital input function) and $$\sum_t f(t+t') \cdot gt$$

when cross-correlating digital input functions for the particular displacement $t'$ that corresponds to the cycle. (Obviously, for analog input functions, the integrator output represents either $\int f(t+t') \cdot f(t) dt$ or $\int f(t+t') \cdot g(t) dt$.)

The integrator output is sampled between cycles by gate 26 at the occurrence of a signal on a lead 28. This signal is also applied through a delay 30 to reset the integrator 24 after sampling. The timing is simplified by using records whose overall lengths are at least double the length required to record the input functions. In this case, the input to the shorter record 14 is also applied to a gate generator 32 which develops a rectangular voltage waveshape beginning with the first element of the function and whose duration equals one half of the record cycle. A differentiator 34 generates a timing signal on a lead 36 at the termination of the gate generator output signal. This timing signal is regenerated after each cycle and applied on the lead 28 to sample the gate 26 and to subsequently reset the integrator 24. The signal can be regenerated in many ways. One simple technique is shown, wherein the signal is recorded on a separate channel on the shorter record by means of a read in head 38 and read out after each cycle by a read out head 40.

Each output of the gate 26 corresponds to an autocorrelation function sum or a cross-correlation function sum corresponding to a particular time displacement $t'$. Thus, a sequence of outputs from the gate represents the entire autocorrelation function or cross-correlation function of the input function(s). After a number of cycles that is sufficient to return the records to their original phase relationship, the output function is complete and further operation of the apparatus causes the output function to be repeated.

Obviously, many modifications of the apparatus shown in FIGURE 1 may be made without detracting from its operation. For example, the records may differ in length by a multiple of $t'$ and all outputs are still generated, but in a different sequence. Furthermore, the positions of the read in and read out heads as well as the direction of record movement may be altered without changing the sequence of output signals, but the relative time of occurrence of the output signals is altered. If desired, the positions of the heads can be adjusted such that the first output sum corresponds to the most positive displacement $t'$, and successive output sums correspond to incrementally decreased displacements, until the most negative displacement is obtained.

The invention will now be further described with respect to the timing diagrams shown in FIGURES 2 through 5 which illustrate its operation when generating autocorrelation functions and cross-correlation functions of sample digital and analog input functions.

FIGURE 2 illustrates the operation of the invention when generating the autocorrelation function of a digital input function. By way of example, the input function $f(t)$ (uppermost waveshape in FIGURE 2a) is shown to represent the binary word 10111. The remaining waveshapes in FIGURE 2a represent this function with time displacements $t'$ varying from $-5$ to $+5$. The resulting autocorrelation function is shown in FIGURE 2b. The sum corresponding to each displacement $t'$ can be observed to correspond to the sum of the "1" elements of the input function which coincide in time with the "1" elements of the displaced function. Dotted lines have been drawn corresponding to the "1" elements of the input functions $f(t)$ to simplify the observation of the sums. For example, when $t'=-2$, it can be seen that the first and third elements of the input function $f(t)$ coincide in time with the third and fifth elements of the displaced function $f(t-2)$, resulting in an autocorrelation function sum of 2.

FIGURE 3 illustrates the operation of the invention when cross-correlating two digital input functions: $f(t)$ and $g(t)$ shown, by way of example, in FIGURE 3a to be 10111 and 11001, respectively. The input cross-correlation function shown in FIGURE 3b contains constituent sums that are obtained by comparing the displaced function $f(t+t')$ with the function $g(t)$. For example, when $t'=-1$, it can be seen that the second element of the function $g(t)$ coincides in time with the third element of the displaced function $f(t-1)$ resulting in a cross-correlation function sum of 1.

FIGURES 4 and 5 are equivalent to FIGURES 2 and 3 for analog input functions. In FIGURE 4a, an analog "sawtooth" signal $f(t)$ is autocorrelated to provide the waveshape shown in FIGURE 4b. The waveshape shown in FIGURE 5b results from cross-correlating the analog input signals $f(t)$ and $g(t)$, representing a sawtooth signal and a rectangular signal, as shown in FIGURE 5a.

The present invention provides a function generator that is suitable for generating autocorrelation functions and cross-correlation functions of digital or analog input functions. The generator is comprised of two cyclically-operable records, such as magnetic tape loops, and a simple electronic circuit. This invention can be used in many applications where an economical correlation function generator is required for signal analysis.

While the invention has been particularly shown and described with reference to a preferred embodiment thereof, it will be understood by those skilled in the art that various changes in form and details may be made therein without departing from the spirit and scope of the invention.

What is claimed is.

1. An apparatus comprising, in combination: a plurality of cyclically-movable records where the length of at least one record is different from the length of at least one other record; read in means for storing data on the records; read out means for sensing the data stored on the records; and means for continuously moving the records at the same linear speed to cyclically present the records to the read out means such that corresponding areas on the records are presented to the read out means at different relative times during successive cycles.

2. An apparatus comprising, in combination: a first cyclically-movable record; a second cyclically-movable record having a length that is different from the first record; read in means for storing data on the records; read out means for sensing the data stored on the records; and means for cyclically presenting the records to the read out means at the same continuous linear speed such that the time of presenting an area on the first record differs from the time of presenting the corresponding area on the second record by a different amount during successive cycles.

3. An apparatus comprising, in combination: a first continuous cyclically-movable record; a second continuous cyclically-movable record that is different in length from the first record; read in means for storing data on the record; read out means for sensing the data stored on the records; and means for cyclically presenting the records to the read out means at the same linear speed, whereby corresponding areas on the records are presented to the read out means at different relative times during successive cycles due to the difference in length of the records.

4. An apparatus comprising, in combination: a first magnetic tape loop; a second magnetic tape loop that is different in length from the first tape loop; means for cyclically moving both tape loops at the same linear speed; read in means for magnetically storing data on the tape loops as the tape loops are moving; and read out means for sensing the magnetically stored data on both tape loops as the tape loops are moving, whereby the data stored on corresponding areas on the tape loops is presented to the read out means at different relative times during successive cycles.

5. An apparatus comprising, in combination: a first record loop; a second record loop that is different in length from the first record loop; means for cyclically moving both record loops at the same linear speed; read in means for storing data on the record loops as the record loops are moving; and read out means for sensing the data stored on both record loops as the record loops are moving, whereby the data stored in corresponding areas on the tape loops is presented to the read out means at different relative times during successive cycles.

6. An apparatus comprising, in combination: a first cyclically-movable record having a first storage time-length; a second cyclically-movable record having a storage time-length that is different from the storage time-length of the first record; read in means for storing information on both records; read out means for sensing the information stored on both records; and means for repeatedly presenting each record to the read out means at the same speed of data presentation, whereby corresponding data on each record is presented to the read out means at different relative times during successive presentations.

7. An apparatus comprising, in combination: a plurality of cyclically-movable records where the storage time-length of at least one record is different from the storage time-length of at least one other record; read in means for storing data on the records; read out means for sensing the data stored on the records; and means for repeatedly presenting each record to the read out means at the same speed of data presentation, whereby corresponding data on the records is sensed with a timed relationship that is different during successive sensings.

References Cited in the file of this patent

UNITED STATES PATENTS

| | | |
|---|---|---|
| 2,794,965 | Yost | June 4, 1957 |
| 2,864,556 | Raymond | Dec. 16, 1958 |
| 3,018,962 | Jones et al. | Jan. 30, 1962 |
| 3,045,916 | Downes | July 24, 1962 |

OTHER REFERENCES

"A High Speed Correlator," Bell et al., JRE Transactions-Electronic Computers, June 1954, page 31 relied upon.

"A Computer for Correlation Functions," Brooks et al., The Review of Scientific Instruments, vol. 23, No. 3, March 1952, pp. 121–126 relied upon.